United States Patent
Rodden

[11] Patent Number: 6,139,809
[45] Date of Patent: Oct. 31, 2000

[54] INJECTED FLOW OZONE GENERATOR

[76] Inventor: Raymond M. Rodden, 443 Donaldson Ave., Pacifica, Calif. 94044

[21] Appl. No.: 09/057,593

[22] Filed: Apr. 9, 1998

[51] Int. Cl.$^7$ ........................................................ B01J 19/08
[52] U.S. Cl. .................... 422/186.07; 422/186.22
[58] Field of Search ..................... 422/186.07, 186.22

[56] References Cited

U.S. PATENT DOCUMENTS

| | | | |
|---|---|---|---|
| 4,176,061 | 11/1979 | Stopka | 210/63 Z |
| 4,988,484 | 1/1991 | Karlson | 422/186.19 |
| 5,008,087 | 4/1991 | Batchelor | 422/186.22 |
| 5,154,737 | 10/1992 | Jenkins et al. | 55/26 |
| 5,169,606 | 12/1992 | Batchelor | 422/186 |
| 5,181,399 | 1/1993 | Engel et al. | 68/13 |
| 5,433,927 | 7/1995 | Mausgrover et al. | 422/186.07 |
| 5,545,380 | 8/1996 | Gray | 422/186.07 |
| 5,552,125 | 9/1996 | Chamblee | 422/186.07 |
| 5,569,437 | 10/1996 | Stiehl et al. | 422/186.07 |
| 5,578,280 | 4/1995 | Kazi et al. | 422/186.07 |
| 5,587,131 | 12/1996 | Malkin et al. | 422/186.11 |
| 5,630,990 | 5/1997 | Conrad et al. | 422/186.07 |
| 5,667,756 | 9/1997 | Ho | 422/186.18 |

*Primary Examiner*—Kathryn Gorgos
*Assistant Examiner*—Jonathan Brown
*Attorney, Agent, or Firm*—Philip D. Freedman

[57] ABSTRACT

Ozone is generated by injecting a flow of oxygen or oxygen enriched air into a corona discharge zone formed between concentric inner tubular electrode/dielectric and outer tubular electrode. The dielectric of the tubular electrode/dielectric has a sealed end. The feed stream of oxygen or oxygen enriched air is injected by a tubular gas injector having an inlet end to accept the oxygen or oxygen enriched air and outlet end to inject the oxygen or oxygen enriched air within the inner concentric electrode/dielectric in proximity to the sealed end to flow the length of the inner concentric electrode/dielectric to the corona discharge zone for conversion of oxygen to ozone.

24 Claims, 4 Drawing Sheets

INJECTED FLOW OZONE GENERATOR

FIELD OF THE INVENTION

The invention is directed to an ozone generator and to a process for converting oxygen into ozone.

BACKGROUND OF THE INVENTION

Ozone is a chemical agent used in industrial oxidation, water and air treatment and in may chemical syntheses. Ozone is an unstable gas, which is produced by the disassociation-association of oxygen in an electric field derived from a high voltage alternating sinusoidal current operating at frequencies typically between about 60 and 5000 Hz and voltages frequently above 20 kilovolts. Ozone generators create the electric field by corona discharge between an electrode and opposing electrode with intervening dielectric.

A tubular type generator 10 is shown in FIG. 1 and is described in Chamblee et al., U.S. Pat. No. 5,552,125. The generator 10 includes a tubular inner electrode 11 and an outer tubular electrode 13 concentric with the inner electrode 11 and mounted so as to define an annular flow path 12 for oxygen containing gas between the electrodes 11, 13. The inner electrode 11 is coated with a dielectric 14 on a surface between the inner 11 and outer 13 electrodes. The inner electrode 11 includes a hollow interior 15 for the passage of coolant. The inner electrode 11 is connected to a voltage source 16 by a high voltage line and the outer electrode is grounded.

An oxygen containing gas ($O_2$) flows into the annular path 12 between the dielectric 14 and outer electrode 13 where a corona discharge between the electrodes 11, 13 converts some oxygen to ozone ($O_3$). The discharge also generates heat. The heat suppresses ozone generation by converting some product ozone back to oxygen. A coolant 17 is passed into the hollow interior 15 of the inner electrode 11 to prevent heat buildup and consequential loss of product ozone. However, ozone is produced on the interior (inside diameter) of the inner electrode 11, particularly at and near the connection of the high voltage line. The coolant gas can sweep ozone from the interior 15 of the inner electrode 11 into the work area 18. Ozone is a gas that is environmentally deleterious in closed work areas. Sweeping the interior 15 of the inner electrode 11 with a cooling fluid creates an environmental hazard to workers in the vicinity of the ozone generator.

Another type of ozone generator is shown in FIG. 2, which is reproduced from Conrad et al., U.S. Pat. No. 5,630,990. In FIG. 2, tubular generator 20 includes a first electrode 25 and a second, larger diameter, electrode 26. Electrode 25 has a layer of dielectric material 27 disposed on the surface thereof and is positioned within electrode 26 to form a gap 28. A flow of feed oxygen or oxygen enriched air is directed as shown by the top arrows into a longitudinal spacing between tubular electrode 25/dielectric 27 and thence as illustrated by the arrows, to discharge gap 28 between tubular electrode 26 and concentric electrode 25/dielectric 27, thence to an exit port near the entry port of the flow of feed oxygen or oxygen enriched air. Heat and ozone produced on the surface of the inside diameter of electrode 25/dielectric 27 are swept by the feed oxygen/oxygen enriched air as a part of the charge to the discharge gap 28.

The tubular generator of the invention is characterized by a design that achieves improved dissipation of heat and ozone without undesirable discharge into the atmosphere. In one embodiment, the inventive generator is fitted with a transparent cap to permit direct observation of the corona discharge. Observation of the corona discharge permits immediate identification of electrode defects. The ozone generator of the present invention is characterized by a sealed end dielectric tube that allows flow path control of feed gas and permits visual observation of an interior electrode to assure that the interior electrode is properly operating. The ozone generator of the invention permits direct injection of product ozone into a reaction vessel for industrial oxidations, treatments or chemical syntheses.

SUMMARY OF THE INVENTION

The present invention relates to a tubular ozone generator comprising concentric inner tubular electrode/dielectric and outer tubular electrode with a corona discharge zone between the inner tubular electrode/dielectric and outer tubular electrode. The inner electrode/dielectric is characterized by a dielectric tube with a sealed end and an open end. The outer tubular electrode has an open exhaust end concentric with the sealed end of the inner tubular electrode/dielectric and a closed end forming a port with the open end of the inner tubular electrode/dielectric. The tubular ozone generator also includes a tubular gas injector within and concentric with the inner tubular electrode/dielectric. The tubular gas injector has an inlet end to accept a gas feed and outlet end to inject a gas feed toward the sealed end of the dielectric tube so that gas feed flows the length of the inside diameter of the tubular electrode/dielectric.

Additionally, the invention relates to a method of producing ozone wherein a flow of oxygen or oxygen enriched air is injected into a corona discharge zone formed between concentric inner tubular electrode/dielectric and outer tubular electrode. A feed stream of the oxygen or oxygen enriched air is injected to within the inner concentric electrode/dielectric by a tubular gas injector having an inlet end to accept the oxygen or oxygen enriched air and outlet end to inject the oxygen or oxygen enriched air within the inner concentric electrode/dielectric to flow within the concentric electrode/dielectric to the corona discharge zone for conversion of oxygen to ozone.

BRIEF DESCRIPTION OF THE DRAWINGS

The invention is more readily understood and appreciated by reference to the following drawings.

DESCRIPTION OF A PREFERRED EMBODIMENT

Figure 3:
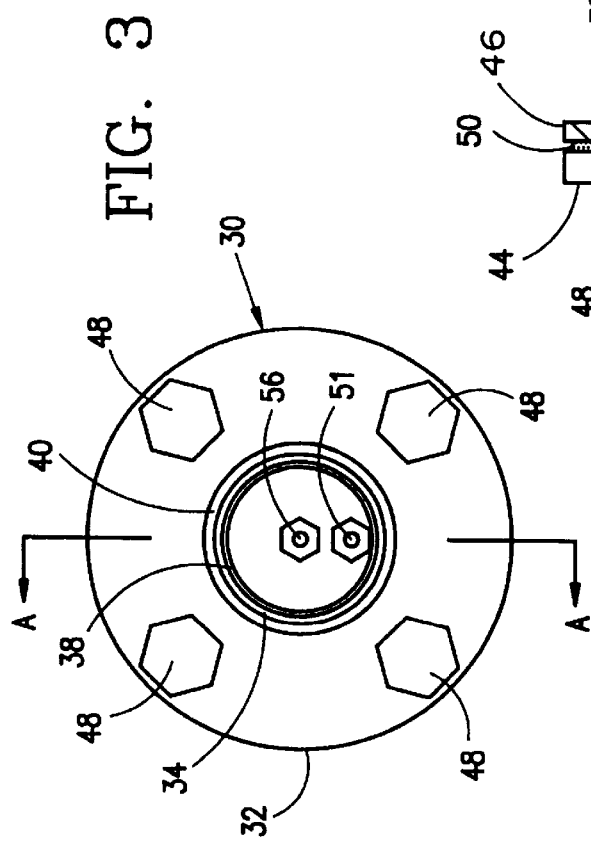
FIG. 3 shows a front end view of the generator of the present invention.
Figure 4:
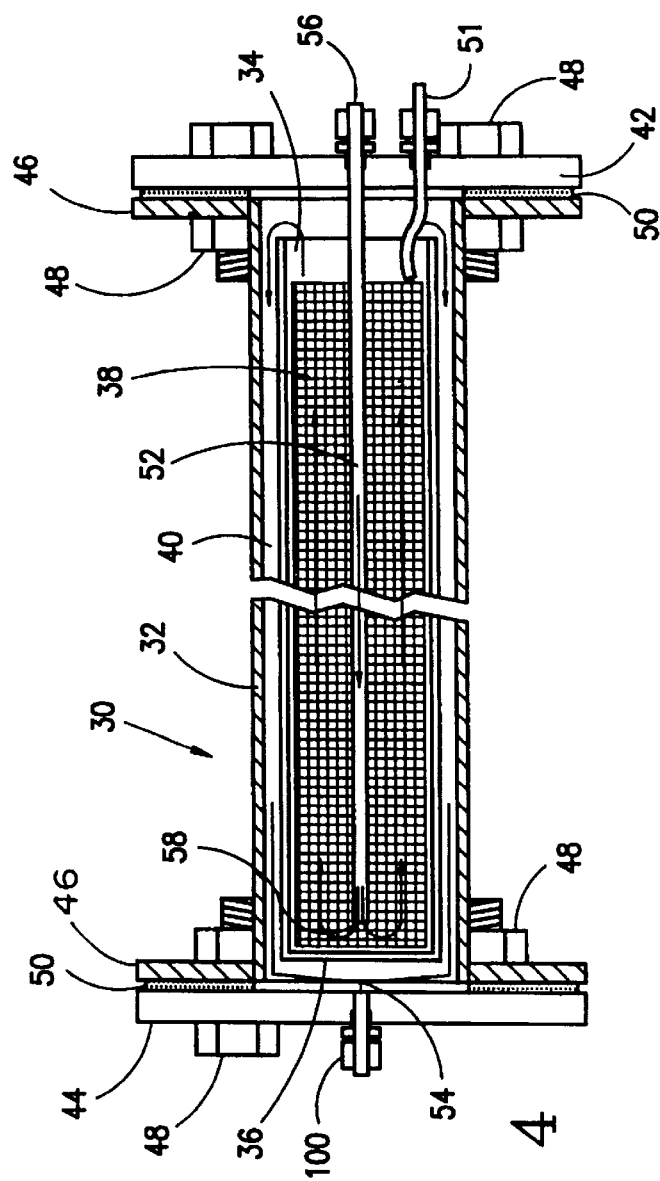
FIG. 4 shows a sectional view along the line a—a of the generator of FIG. 3.

Referring to FIGS. 3 and 4, the generator 30 includes an outer tubular electrode casing 32, which can be stainless steel. Within outer tubular electrode 32 and concentric therewith is tube 34 which comprises a dielectric material such as glass. The dielectric tube 34 terminates in a closed end 36. Inner tubular electrode 38 is adjacent the inner surface of tubular electrode 32 to form an electrode/dielectric. Inner tubular electrode 38 can be made of any material or structure suitable to form an electrode. For example, the electrode 38 can be a solid integral structure such as a tube or a conductive surface coated onto dielectric tube 34. Preferably the inner tubular electrode 38 is a stainless steel mesh structure for reasons hereinafter described.

Outer tubular electrode 32, tubular dielectric 34 and tubular inner electrode 38 are concentric to one another as shown and are separated to form corona discharge zone 40. Outer tubular electrode 32 is capped by transparent end caps 42, 44. The concentric electrodes 32 and 38 and dielectric 34 and the end caps 42, 44 are secured to flanges 46 by means of nut and bolt combinations 48 with gaskets 50 intervening between the end caps 42. 44 and respective flanges 46.

Lead 51 connects inner electrode 38 to a high voltage source (not shown). Ozone containing gas output port 54 connects to corona discharge zone 40 through product end cap 42 to provide a discharge of product ozone gas from the generator 30. Feed air is injected into the generator 40 by means of tubular gas injector 52 at injector feed gas end 56 and is discharged from generator 30 as ozone containing gas from the output port 54. As shown in the preferred embodiment, the tubular gas injector 52 extends concentric with the inner tubular electrode 38, dielectric 34 and outer tubular electrode 32 to terminate in an injector discharge end 58 that is within close proximity to the dielectric tube closed end 36. The extending injector 52 enables injection of feed gas into the generator 30 at a point within proximity to the closed end 36 of dielectric 34 to permit feed gas flow to initially sweep substantially the entire length of the inner surface (inside diameter) of the tubular electrode 38 prior to feed of the gas into corona discharge zone 40. Additionally, discharge of feed gas within a proximity of closed end 36 results in a net lateral flow of feed gas from feed gas end 56 of tubular gas injector 52 to ozone output port 54 of the generator 30.

Figure 5:
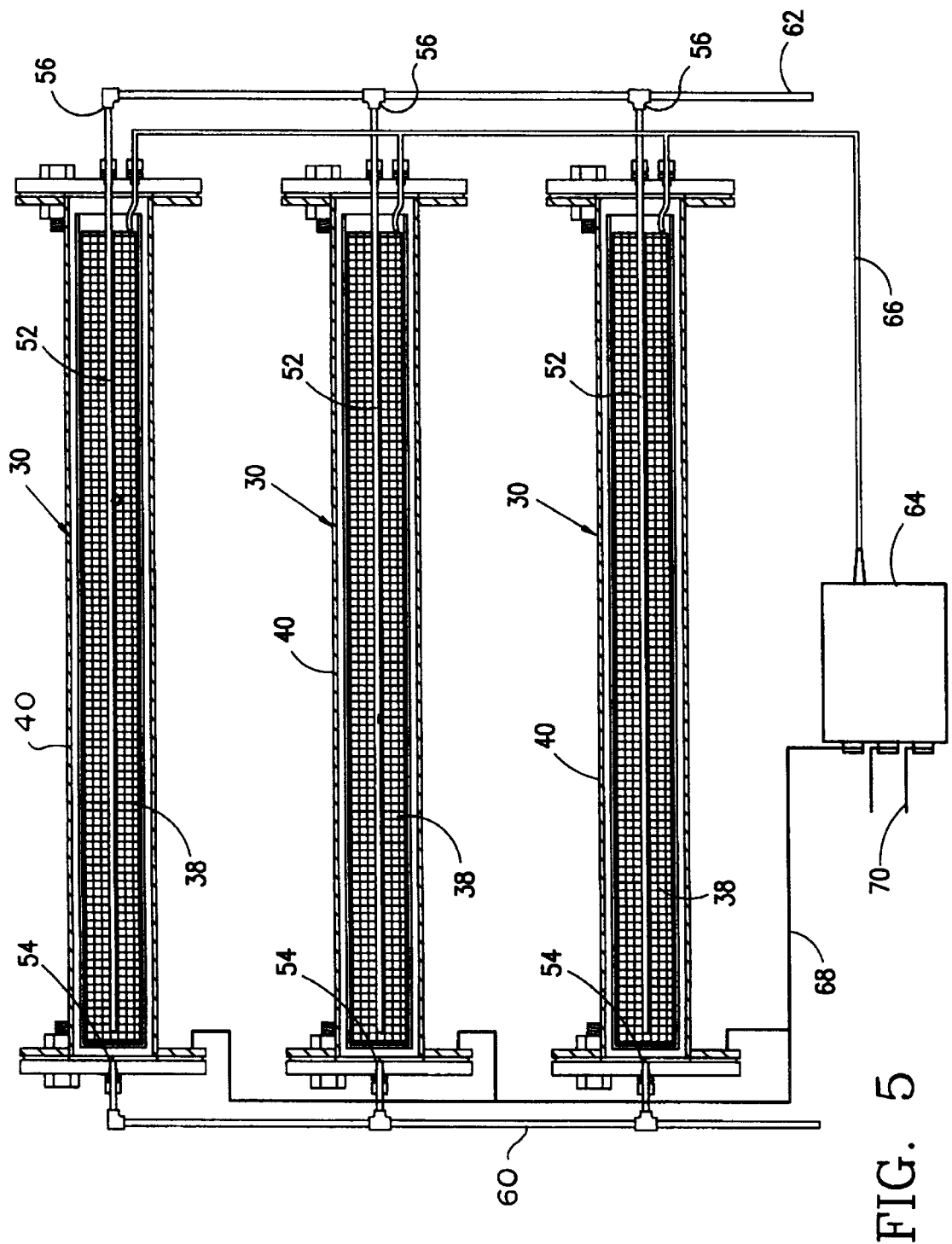
FIG. 5 shows an array of generators of FIG. 3 and FIG. 4 arranged to produce ozone for injection into a treatment zone.

Referring to FIG. 5, connector conduit 60 is shown connecting a plurality of ozone generators 30 via respective ports 54 to provide ozone to a treatment zone (not shown). Feed gas conduit 62 provides feed gas to respective tubular gas injectors 52 at injector feed gas ends 56. High voltage is applied to each corona discharge zone 40 of each generator 30 to convert oxygen in the feed gas to ozone. Each inner tubular electrode 38 of each generator 30 is connected to transformer 64 via high voltage lead 66 and is grounded via ground lead 68. Transformer 64 generates high voltage from line voltage 70 to provide corona discharge in each corona discharge zone 40.

The improved ozone generator of the present invention is particularly advantageous when incorporated as part of a plurality or array of generators as shown in FIG. 5. The inner electrode 38 of generator 30 is prone to defects that result in improper operation. Closed end 36 of dielectric 34 can be a transparent material to permit visual observation of the interior of inner electrode 38 and of the corona discharge zone 40 during operation. The corona field in the vicinity of the inner electrode 38 appears as a light violet glow. Defects in the electrode 38 appear dark violet and are visually apparent in contrast to properly operating areas that are lighter violet in color. A defective prior art generator in a plurality of arrays can not be identified without stopping operation, disassembly of every generator of the array, replacement of the defective electrode and reassembly of the entire array. The present invention permits immediate identification of a generator with a defective electrode. Only the generator with the defective electrode need be disassembled and replaced. Disassembly of the entire array is not necessary.

According to the process of the present invention, a flow of oxygen or oxygen enriched air is injected 58 into corona discharge zone 40 formed between concentric inner tubular electrode/dielectric 34, 38 and outer tubular electrode 32 wherein oxygen in the enriched air is converted to ozone. The process comprises injecting a feed stream of oxygen or oxygen enriched air by tubular gas injector 52 having an inlet end 56 to accept the oxygen or oxygen enriched air and outlet end 58 to inject the oxygen or oxygen enriched air within the inner concentric electrode/dielectric 34, 38. The injected air flows within the inner concentric electrode/dielectric 34, 38 to the corona discharge zone 40 for conversion of oxygen to ozone. The flow of oxygen or oxygen enriched air is injected by tubular gas injector 52 within the inner concentric electrode/dielectric 34, 38 in a proximity of a capped end 36 of dielectric 34 of the inner concentric electrode/dielectric 34, 38. The injected feed stream washes an inner surface (inside diameter) of the inner concentric electrode/dielectric 34, 38 to scavenge ozone from within the inner concentric electrode/dielectric 34, 38. The injected feed stream displaces heat by convection from the inner concentric electrode/dielectric 34, 38.

Figure 6:
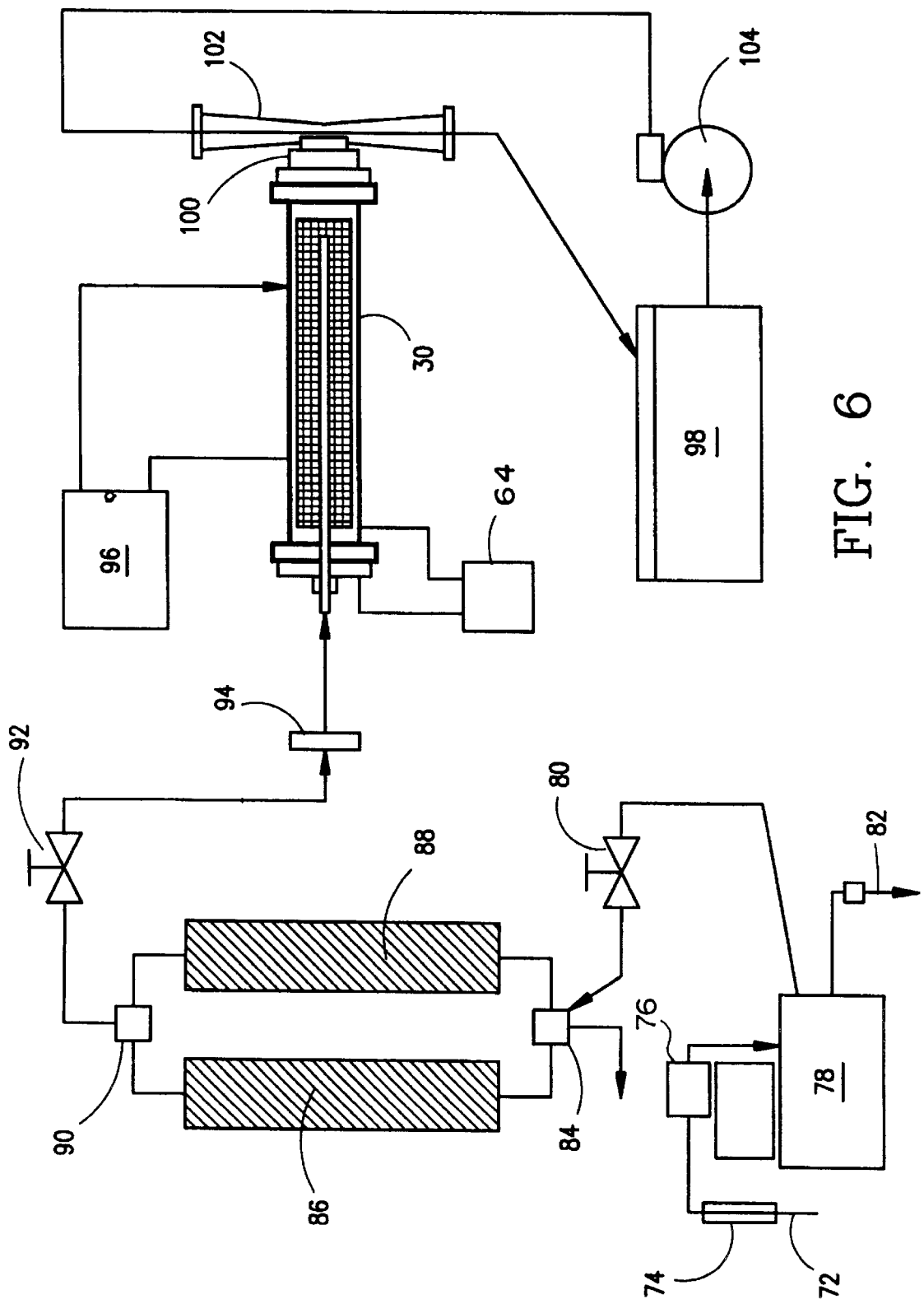
FIG. 6 is a schematic representation of an ozone generator treatment system and process of an embodiment of the invention.

Referring to FIG. 6, shown is an overall ozone generator and treatment system and process. The first step in the process is air preparation. Ambient air 72 is drawn into a compressor 76 through an intake filter 74. A filtered air stream is sent to a storage/receiver tank 78, where initial moisture is removed as a condensate, which is discharged 82 from tank 78 at timed intervals. This initial separation of moisture extends sieve bed and other line filtration component life. Air in tank 78 is pressurized to 100 PSI in on and off cycles to extend compressor unit life.

Pressurized air from tank 78 is passed through a submicron filter (not shown) and sent to input regulator 80, where pressure is adjusted. The air is then sent to a control solenoid valve 84, which is electrically controlled by a timer to alternately charge the air stream to sieve bed 86 or sieve bed 88, and to alternately exhaust the bed 86 or 88. As one sieve bed is pressurized and provided with air stream, the complementary sieve bed is recharged. The molecular sieve beds 86, 88 absorb excess nitrogen from the feed air stream in a pressurized mode and release a product air stream, reduced in nitrogen (oxygen-enriched), in a decompression mode. This method of oxygen production is called Pressure Swing Absorption (PSA).

The oxygen-enriched air stream exits sieve beds 86, 88 via a shuttle valve 90. Pressure is regulated 92. Flow meter 94 precisely measures the air stream prior to passing the stream through the ozone producing generator 30. Ozone producing generator 30 is a corona discharge type shown in detail in FIGS. 3 and 4 and having a tubular outer cell 32 with an internal glass dielectric 34. The dielectric 34 has a conductive material applied to its inner surface (to form inner electrode 38) connected to high voltage, high-frequency power supply 64. The outer tube 32 acts as a ground. Between outer tube 32 and the dielectric 34 is an air gap (the corona discharge zone) 40. When power is applied to the assembly, a high-intensity corona is formed in the air gap 40. The oxygen-enriched feed gas stream passes through the air gap 40 and the intense corona (violet in color) converts a percentage of the oxygen to ozone. The air gap 40 and frequency of the power supply are adjusted for optimum corona density to produce maximum ozone output per square centimeter of electrode surface area.

Heat is a by-product of ozone production. Excess heat will convert ozone back to oxygen. The problem can be addressed by utilizing a closed-loop, liquid-cooled electrode chilling system 96. However, a chilling system may result in atmospheric ozone release. The structure of the ozone generator 30 of the present invention provides a feed stream that sweeps an area of excess heat build up in the direction of diffusion of the stream so that the heat is convected through corona discharge zone 40 to discharge with product gas at output port 54.

Figure 1:
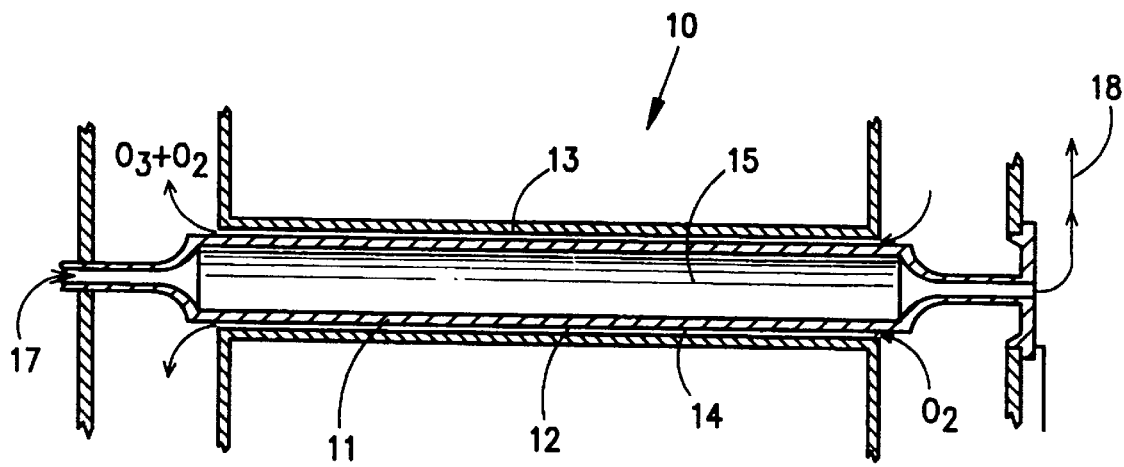
FIG. 1 shows a prior art ozone generator.
Figure 2:
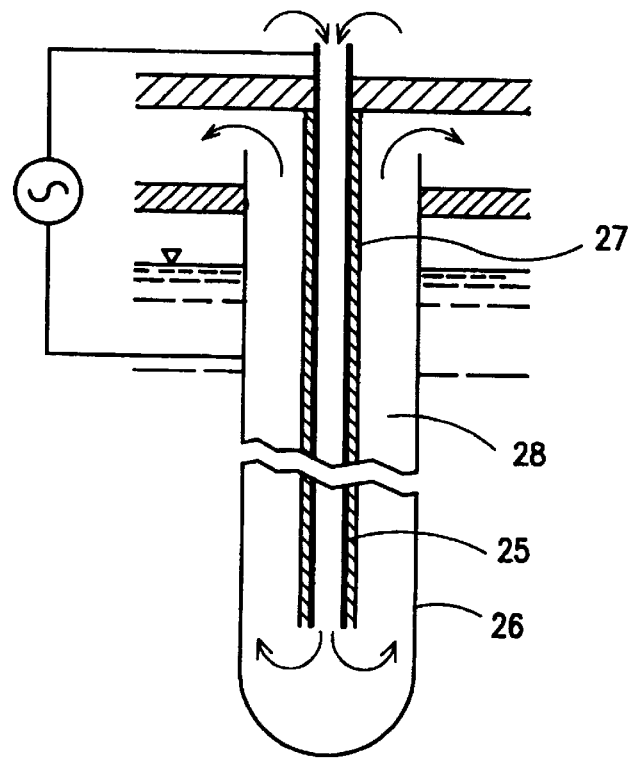
FIG. 2 shows another prior art ozone generator.

FIG. 6 illustrates another advantage of the present invention. The configuration of generator 30 results in a net linear flow of feed gas from injector feed end 56 to ozone output port 54. The FIG. 2 prior art generator discharges product ozone gas from the generator end where feed gas is injected. The configuration of the FIG. 2 generator requires extensive fittings and extending conduits to transport product ozone gas to a treatment zone. In the configuration of FIG. 3 and FIG. 4, output port 54 is located at an end opposite feed end 56. Referring to FIG. 6, output port 54 can be directly connected via connector fitting 100 to the recycle circuit of a treatment zone 98, such as a bubble type diffuser, without requiring intervening structure. The recycle circuit includes bubble diffuser 102 and pumping system 104. In a bubble diffuser, the highly concentrated ozone product is applied to the bottom of a tall column to move counter current to flow of treated fluid. The direct connection to the recycle circuit via fitting 100 shown in FIG. 6, results in a configuration that decreases loss of ozone into the atmosphere that otherwise accompanies configurations such as shown in FIG. 2.

Other modifications of the present invention will occur to those skilled in the art subsequent to a review of the present application. These modifications and equivalents thereof are intended to be included within the scope of this invention.

What is claimed is:

1. A tubular ozone generator, comprising concentric inner tubular electrode/dielectric with inner electrode in intimate length-to-length contact with dielectric and outer tubular electrode with corona discharge zone between said inner tubular electrode/dielectric and outer tubular electrode, an electrode of said inner tubular electrode/dielectric having a sealed end and an open end, said outer tubular electrode having an open exhaust end concentric with said sealed end of said inner tubular dielectric and a closed end forming a port with said open end of said inner tubular dielectric and a tubular gas injector within and concentric with said inner tubular electrode/dielectric, said tubular gas injector having an inlet end to accept a gas feed and outlet end to inject a gas feed toward said sealed end of said inner tubular dielectric, whereby injected gas flows from said sealed end to dissipate heat within a zone between said concentric inner tubular electrode/dielectric and said tubular gas injector, thence through said port to said corona discharge zone wherein said gas flow is subjected to a corona discharge to form ozone and thence to exit said generator at said open exhaust end of said outer tube.

2. The tubular ozone generator of claim 1, wherein said inner tubular electrode/dielectric comprises a dielectric and a mesh electrode, solid tubular electrode or conductive surface coated onto said dielectric.

3. The tubular ozone generator of claim 1, further comprising a connector at said open exhaust end of said outer tube to permit direct connection to an ozone treatment zone.

4. The tubular ozone generator of claim 1, wherein said sealed end of said inner tubular dielectric is sealed with a transparent end cap to permit visual inspection of an electrode of said electrode/dielectric during operation of said generator.

5. A plurality of tubular ozone generators of claim 1, arranged to provide ozone enriched gas product to a treatment zone.

6. A tubular ozone generator, comprising concentric inner tubular electrode/dielectric electrode/dielectric with inner electrode in intimate length-to-length contact with dielectric, and outer tubular electrode with corona discharge zone between said inner tubular electrode/dielectric and outer tubular electrode, a dielectric of said inner tubular electrode/dielectric having a sealed end and an open end, said outer tubular electrode having an open exhaust end concentric with said sealed end of said dielectric and a closed end forming a port with said open end of said dielectric wherein said sealed end of said dielectric is sealed with a transparent end cap to permit visual inspection of an electrode of said electrode/dielectric during operation of said generator.

7. The tubular ozone generator of claim 6, wherein said inner tubular electrode/dielectric comprises a dielectric and a mesh electrode, solid tubular electrode or conductive surface coated onto said dielectric.

8. The tubular ozone generator of claim 6, further comprising a connector at said open exhaust end of said outer tube to permit direct connection to an ozone treatment zone.

9. The tubular ozone generator of claim 6, further comprising a tubular gas injector within and concentric with said inner tubular electrode/dielectric, said tubular gas injector having an inlet end to accept a gas feed and outlet end to inject a gas feed toward said sealed end of said dielectric, whereby injected gas flows from said sealed end to dissipate heat within a zone between said concentric inner tubular electrode/dielectric and said tubular gas passage, thence through said port to said corona discharge zone wherein said gas flow is subjected to a corona discharge to form ozone and thence to exit said generator at said open exhaust end of said outer tube.

10. An ozone generator system, comprising a plurality of tubular ozone generators of claim 6, arranged to provide ozone enriched gas product to a treatment zone.

11. The ozone generator system of claim 10, wherein said tubular ozone generator comprises a connector at said open exhaust end of said outer tube to permit direct connection to an ozone treatment zone.

12. The ozone generator system of claim 11, wherein said plurality of tubular ozone generators is connected directly to a treatment zone without intervening conduit structure.

13. The ozone generator system of claim 10, wherein said tubular ozone generator further comprises a tubular gas injector within and concentric with said inner tubular electrode/dielectric, said tubular gas injector having an inlet end to accept a gas feed and outlet end to inject a gas feed toward said sealed end of said dielectric, whereby injected gas flows from said sealed end to dissipate heat within a zone between said concentric inner tubular electrode/dielectric and said tubular gas injector, thence through said port to said corona discharge zone wherein said gas flow is subjected to a corona discharge to form ozone and thence to exit said generator at said open exhaust end of said outer tube.

14. An ozone treatment system, comprising pressure swing absorption sieve beds to produce an oxygen enriched air and at least one tubular ozone generator according to claim 6 connected to a treatment zone.

15. The ozone treatment system of claim 14, wherein said treatment zone comprises industrial or toxic soiled laundry water.

16. A method of producing ozone wherein a flow of oxygen or oxygen enriched air is injected into a corona discharge zone formed between concentric inner tubular electrode/dielectric with inner electrode in intimate length-to-length contact with dielectric, a outer tubular electrode wherein oxygen in said enriched air is converted to ozone; comprising injecting a feed stream of said oxygen or oxygen enriched air by a tubular gas injector having an inlet end to accept said oxygen or oxygen enriched air and outlet end to inject said oxygen or oxygen enriched air within said inner concentric electrode/dielectric to flow within said inner concentric electrode/dielectric to said corona discharge zone for conversion of oxygen to ozone.

17. The method of claim 16, wherein said flow of oxygen or oxygen enriched air is injected by said tubular gas injector within said inner concentric electrode/dielectric in a proximity of a capped end of a dielectric of said inner concentric electrode/dielectric.

18. The method of claim 16, wherein said injected feed stream washes an inner surface of said inner concentric electrode/dielectric to scavenge ozone from within said inner concentric electrode/dielectric.

19. The method of claim 18, wherein said injected feed stream washes said inner surface of said inner concentric electrode/dielectric to scavenge ozone and to flush heat so as to cool said inner concentric electrode/dielectric.

20. A method of ozone treatment wherein oxygen in a flow of oxygen or oxygen enriched air is converted to ozone according to claim 16, comprising injecting said ozone from said ozonation zone to a treatment zone.

21. A method of ozone treatment wherein oxygen in a flow of oxygen or oxygen enriched air is converted to ozone according to claim 16, comprising injecting said ozone from said ozonation zone directly to a treatment zone without intervening conduit structure.

22. A method of ozone treating, comprising passing air into pressure swing absorption sieve beds to produce oxygen enriched air, injecting a flow of said oxygen enriched air into an ozonation zone according to the method of claim 16 to convert oxygen to ozone and injecting said ozone from said ozonation zone to a treatment zone.

23. The method of ozone treating of claim 22, further comprising ozone treating water in need of said treatment with said ozone.

24. The method of ozone treating of claim 23, wherein said water comprises industrial or toxic soiled laundry water.

* * * * *